United States Patent
Sigler et al.

(10) Patent No.: US 8,033,443 B1
(45) Date of Patent: Oct. 11, 2011

(54) ANVIL WITH ROLLING ELEMENTS FOR FRICTION STIR WELDING

(75) Inventors: David R. Sigler, Shelby Township, MI (US); Yen-Lung Chen, Troy, MI (US); Robert T. Szymanski, St. Clair Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/786,834

(22) Filed: May 25, 2010

(51) Int. Cl.
*B23K 20/12* (2006.01)
*B23K 37/04* (2006.01)

(52) U.S. Cl. ............... 228/2.1; 228/44.3; 228/112.1

(58) Field of Classification Search .............. None
See application file for complete search history.

(56) References Cited

U.S. PATENT DOCUMENTS

| | | | | |
|---|---|---|---|---|
| 6,070,784 | A * | 6/2000 | Holt et al. ............... | 228/112.1 |
| 6,155,402 | A * | 12/2000 | Murphy .................... | 198/346.2 |
| 6,173,880 | B1 * | 1/2001 | Ding et al. ............... | 228/2.1 |
| 6,237,829 | B1 * | 5/2001 | Aota et al. ............... | 228/2.1 |
| 6,259,052 | B1 * | 7/2001 | Ding et al. ............... | 219/59.1 |
| 6,367,681 | B1 | 4/2002 | Waldron et al. | |
| 6,484,924 | B1 * | 11/2002 | Forrest .................... | 228/112.1 |
| 6,953,140 | B2 * | 10/2005 | Park et al. ............... | 228/2.1 |
| 7,210,610 | B2 | 5/2007 | Nelson et al. | |
| 2001/0040179 | A1 * | 11/2001 | Tochigi et al. .......... | 228/2.1 |
| 2003/0217994 | A1 * | 11/2003 | Ding ........................ | 219/121.64 |
| 2004/0187466 | A1 * | 9/2004 | Garcia et al. ............ | 56/328.1 |
| 2004/0232209 | A1 * | 11/2004 | Stol et al. ................ | 228/112.1 |
| 2005/0060888 | A1 * | 3/2005 | Park et al. ............... | 29/888.02 |
| 2005/0092809 | A1 * | 5/2005 | Murakami ............... | 228/2.1 |
| 2005/0092817 | A1 * | 5/2005 | Baumann et al. ....... | 228/212 |
| 2007/0000972 | A1 * | 1/2007 | Koga et al. .............. | 228/112.1 |
| 2009/0014497 | A1 * | 1/2009 | Ryu ........................ | 228/2.3 |

FOREIGN PATENT DOCUMENTS

| | | | | |
|---|---|---|---|---|
| JP | 2005-103607 | A | * | 4/2005 |
| JP | 2007-268558 | A | * | 10/2007 |
| JP | EP-1864747 | A | * | 12/2007 |

OTHER PUBLICATIONS

Machine translation of JP-2005-103607A (no date available).*

* cited by examiner

*Primary Examiner* — Kiley Stoner
(74) *Attorney, Agent, or Firm* — Reising Ethington P.C.

(57) ABSTRACT

In a Friction Stir Welding process a load, applied through a rotating tool, frictionally heats, plasticizes and commingles selected regions of the workpieces while translating along the length of the joint. The load is supported by an anvil. The applied load inhibits relative motion of the workpiece and conventional anvils due to friction which requires application of higher translation forces and could lead to undesired surface blemishes. Thus conventional practice is to employ bulky, stationary anvils. Compact, moveable anvils comprising freely-rotating or freely moving elements in contact with the workpieces and capable of reducing workpiece-anvil friction are described. Particular benefits of this anvil design are illustrated for the process of assembling inner and outer sheet metal components into an automobile assembly, a portion of which is visible to a vehicle customer.

8 Claims, 5 Drawing Sheets

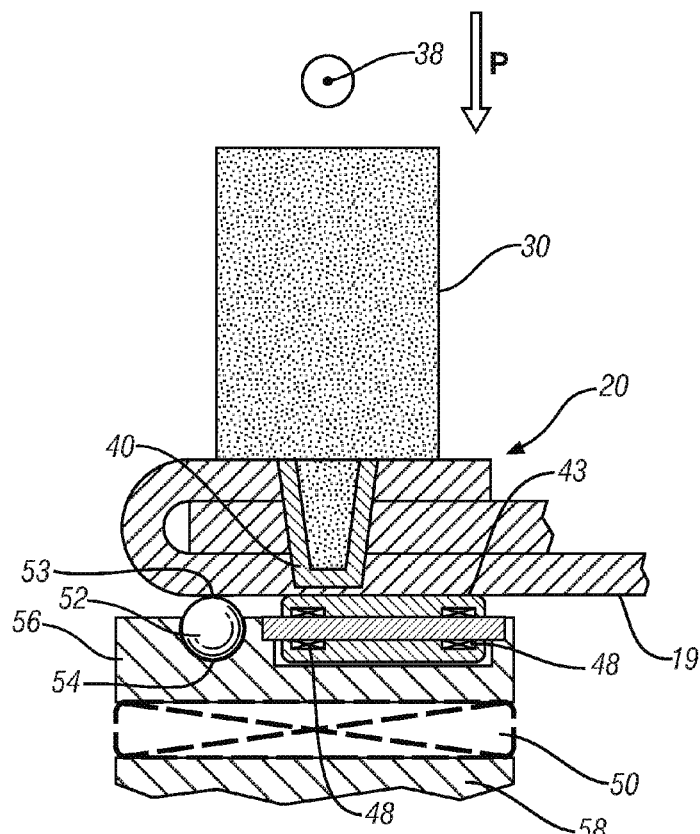
*FIG. 5*
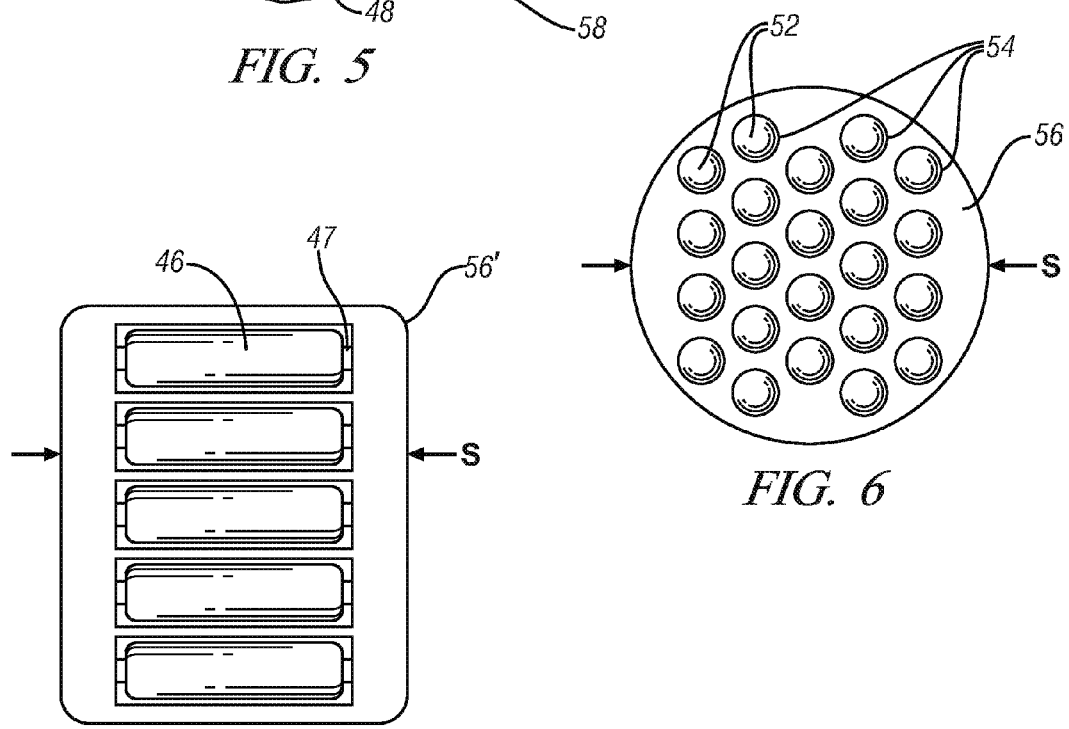
*FIG. 7*
*FIG. 6*

ANVIL WITH ROLLING ELEMENTS FOR FRICTION STIR WELDING

TECHNICAL FIELD

This invention relates to the field of mechanisms for accomplishing friction stir welding and particularly to the nature and design of the supporting anvil structure for friction stir welding.

BACKGROUND OF THE INVENTION

Friction stir welding is a process in which a rotating, round, cylindrical tool with an axially extending pin or protrusion may be used to form a weld between two or more layers of assembled metal workpieces including sheet, extrusions, and castings. The rotating centered pin and adjoining shoulder portion, which defines the maximum tool-workpiece contact region or tool 'footprint', are plunged into a surface of one sheet. The affected sheet metal is softened and plasticized by the frictional heat, and the tool is driven through the first sheet, through any intervening sheet layer, and into the bottom sheet of the assembly, mixing softened metal from each sheet layer into a bonding weld mass. The tool may then be retracted to form a friction stir spot weld or progressively advanced through the sheet layers along a proposed joint line to form a continuous linear seam weld. The assembly of sheet metal layers is often supported against the welding force of the rotating tool by an anvil aligned in opposition with the axis of the tool.

The inventors herein recognize that one potential application for continuous friction stir welding is the fabrication of automobile closure panel assemblies like doors, hoods or decklids. Such assemblies typically comprise an outer panel and a complementary inner panel. The panels may be three or four feet in major directions and cumbersome to handle. Both inner and outer panels may display complex curvature depending on the design of the vehicle and they may be further shaped to accommodate a window, or wiring, or closure mechanisms between them. Typically, the panels have like-shaped peripheral edges at which they are bonded or welded. Sometimes edges of the outer panel are folded over edges of the inner panel in a hem attachment. And welding or other bonding is accomplished through the layers of the hem.

The inventors recognize that friction stir welding might be used to form a continuous seam weld around the peripheral surfaces of assembled vehicle panels fabricated of about 1 millimeter thick sheet. These panels, due to the curvature of the panels and the direction-changing path of their bonding surfaces, present difficulties to present friction stir tool and anvil designs. In this case, conventional practice would call for very large and complex anvils to fully support the friction stir tool over the entire length of the joint path.

The geometry of such a joint, requiring as it does that the tool traverse a long joint with a continuous anvil backup and accommodate joint path variations both in and out of the plane of the joint, requires different tooling—tooling that better accommodates direction-changing movement of the sheet layers between a weld tool and anvil. Also, the anvil will support the welding process by contact with a portion of the vehicle panel's exterior surface, a surface readily viewed by a customer and more often known as a 'show surface'. Any blemish or appearance defect in such a 'show surface' may be removed in a 'metal finishing' operation prior to painting the vehicle but this process incurs additional expense. Thus, a further requirement on such a compact friction stir anvil suitable for use on show surfaces is that the anvil support such 'show surfaces' without imparting blemishes to the 'show panel'.

Another potential application for continuous or semi-continuous friction stir welding is in the fabrication of vehicle structures. Such structures typically comprise multiple panels, which may be up to 4 millimeters thick, and heavier gauge reinforcements. These panels are joined together, conventionally by spot welding, often supplemented by adhesive bonding. Here, access of friction stir weld tooling to the weld zone, particularly access by the anvil, over a continuous length of at least a portion of the overall joint is hindered by a generally complex joint geometry and the number of components involved. However the installation of continuous welds or semi-continuous stitch welds within a vehicle structure could improve static strength, fatigue strength, and overall stiffness and may eliminate adhesives.

There is, therefore, need for a compact movable anvil capable of moving in conjunction with the friction stir weld tool and relative to the workpiece to provide support to the workpiece as the tool and anvil traverse the length of a weld joint. A further desired characteristic of such a compact anvil is that it minimizes frictional interaction between the anvil and anvil-supported workpiece surface when under normal load to enable relative motion between the workpieces and friction stir welder under greatly reduced lateral forces.

SUMMARY OF THE INVENTION

Compact anvils are provided for friction stir welding having dimensions comparable to those of the friction stir weld tool and being capable of reducing frictional forces between a workpiece and the workpiece-contacting surface of the anvil. Each anvil is adapted to work with a rotating friction stir tool, to permit the placement of a multilayer workpiece between the tool and anvil, and then to support the workpiece against the force of the rotating tool while permitting easier relative motion between the workpiece and tool/anvil combination as a linear weld is formed between sheet metal layers of the workpiece.

Each anvil has a body and a surface shaped for engaging a surface of the multilayer workpiece opposite the surface engaged by the rotating friction stir weld tool. The body of the anvil may, in turn, be supported, for example, by a post or a frame structure like a 'C-Frame' adapted to maintain the anvil body and surface positioned in supportive opposition to the thrust and lateral loads generated by the weld tool.

Appreciably-reduced friction may be achieved by having the workpiece-supporting surface be defined by the workpiece-contacting locations of rolling elements incorporated in the anvil surface. These elements may be spheres or balls positioned in close fitting, lubricated housings in the anvil surface, or shaft-mounted cylinders supported on bearings and attached to the anvil body. Such elements, individually, will achieve only line or point contact with the workpiece, but it is intended that each of the plurality of elements act in concert with all others. Thus, the elements will be positioned such that the plurality of lines, or points, of contact of the plurality of elements with the workpiece, lies on a common surface. It is preferred that this common surface be generally planar.

Structures comprising an anvil and associated rolling elements may support the workpieces directly or may support a moveable endless surface like a belt, formed of a series of like elements joined end to end. If a belt is employed, the anvil may incorporate a drive mechanism or other means for maintaining a desired relationship between the belt orientation and the anvil body. The drive mechanism may be active or powered by an independent power source, or it may be passive or unpowered.

Due to the limited span required of the anvil, these low friction structures may support a gently-curved workpiece even if mounted on a generally planar anvil surface. By way of example, a tool with a preferred shoulder diameter ranging from 10 to 12 millimeters will require an anvil with a preferred span of only 15-17 millimeters provided it is properly aligned with the tool. Thus, the lateral extent or span of the anvil will exceed the diameter of the friction stir tool by only a limited extent. This short-span anvil, with a generally planar workpiece-contacting surface may suitably be employed to form peripheral linear seam welds on automobile closure panels with a radius of curvature of between 500 millimeters and 1000 mm.

Thus, in an embodiment, the anvil comprises a plurality of closely-spaced, freely-rolling elements, defining a generally planar surface. The rolling elements in the anvil surface may be spheres or cylinders and may be present in suitable locations and in sufficient number to minimize damage to a workpiece surface moving (or being moved) over rolling elements in the anvil surface.

In a second embodiment, the anvil comprises a moving, closed loop load-bearing belt or track for engaging a workpiece surface. The belt or track may comprise a series of interlocking elements supported by the anvil surface with its closely spaced rolling elements. A drive mechanism may be adapted to guide track motion. The drive mechanism may be active, employing a sensor to determine tool motion and an independent power source, for example a motor drive, to advance the belt. Alternatively, it may be passive so that it will advance in response to the forces applied for advance of the welding tool.

In an aspect of these embodiments it may be preferred to have the friction stir tool and the anvil fixedly attached to a frame or other structural support.

In another aspect of these embodiments, it may be preferred to employ an anvil rotatably attached to a support so that the workpiece-contacting anvil surface may rotate about an axis normal to the plane of the workpiece-contacting surface. This may be achieved by mounting the anvil on a thrust bearing attached to its support. This aspect imparts to the anvil a further degree of freedom, enabling the anvil to present a preferred anvil orientation to the workpiece and accommodate more complex workpiece paths.

Other objects and advantages of the invention will be apparent from a detailed description of preferred embodiments which follows in this specification.

BRIEF DESCRIPTION OF THE DRAWINGS

FIG. 5 shows the same linear friction stir welding process as shown in FIGS. 3 and 4, viewed in the same direction, and illustrating a second embodiment of a moveable anvil.

FIG. 6 shows, in plan view, an arrangement of freely-rotating spherical elements arranged on a third embodiment of a moveable anvil.

FIG. 7 shows, in plan view, an arrangement of freely-rotating cylindrical elements arranged on a fourth embodiment of a moveable anvil.

DESCRIPTION OF PREFERRED EMBODIMENTS

Friction stir welding is commonly practiced to form a continuous weld. The tool generally comprises a cylindrical or conical pin, although other geometries can be used, protruding from the face of a supporting second, larger, generally cylindrical feature, where the pin and the supporting member share a common centerline.

In operation, the pin is rotated about its centerline and is plunged into the workpieces to be joined until the face of the second cylindrical feature, more commonly described as the tool shoulder, just penetrates the workpiece surfaces and the pin is fully immersed in the joint. Both the shoulder and the pin generate heat through frictional interaction with the workpieces to soften and plasticize the workpieces, and the embedded rotating pin, which may incorporate features to enhance its stirring action, then stirs, kneads, mixes and commingles the workpieces. A variety of tool geometries have been developed but for the thin, less than 1 millimeter thick, sheet metal workpieces typically employed for closure panel assemblies, tools with a shoulder diameter of 10-12 millimeters are commonly employed.

Because friction stir welding only introduces sufficient heat to plasticize and make malleable the workpiece materials, retention of the workpiece materials requires the application of considerable thrust forces, or forces directed along the tool axis. Hence to accommodate the thrust forces, the workpieces must be supported. Support is provided by an anvil.

The tool and anvil must always be positioned in opposition to one another. Thus fabrication of linear welds requires either an extended anvil suitable for supporting the workpieces along the entire length of the weld seam, the conventional practice, or a compact moveable anvil capable of moving in concert with the tool. It is preferred that the dimension, or span of the compact moveable anvil be consistent with the diameter of the tool shoulder. Particularly it is preferred that the span of the anvil range from 120% to 200% of the tool shoulder diameter. This range permits some tool-anvil misalignment while maintaining the desired small anvil footprint.

Figure 1:
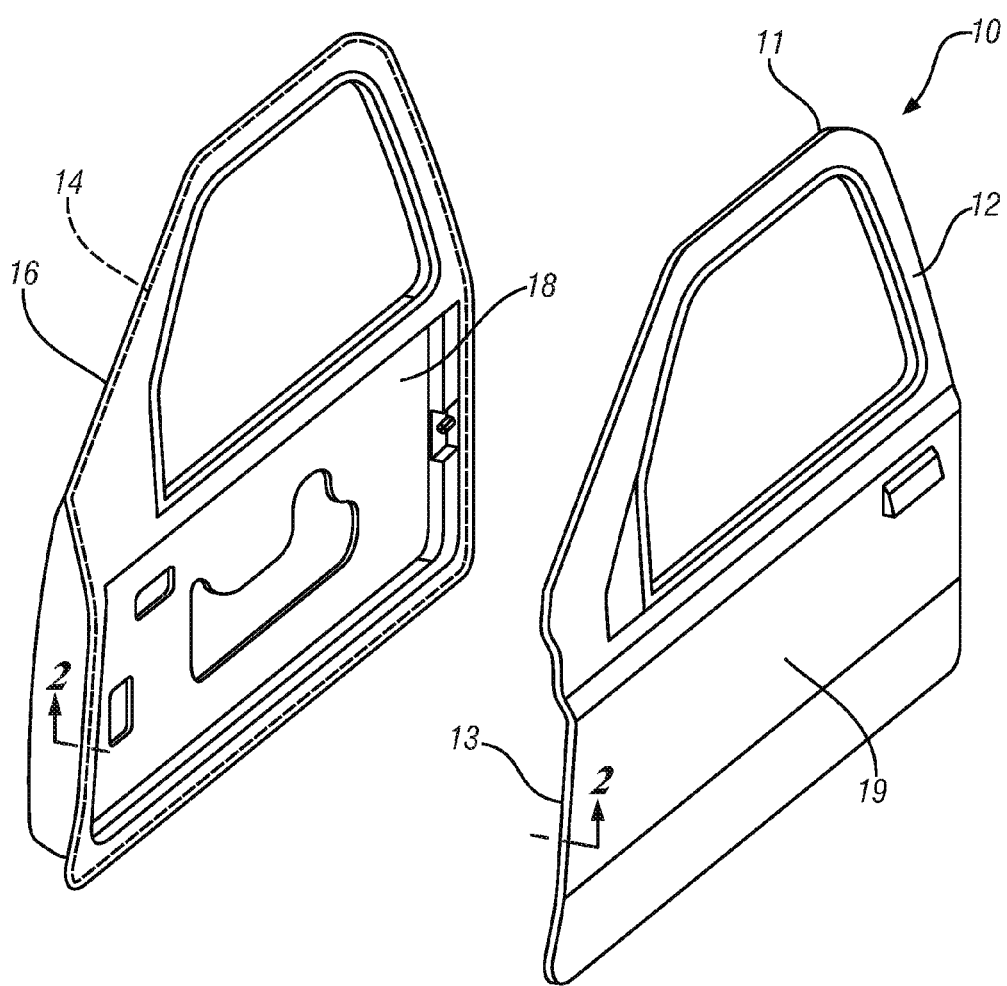
FIG. 1 shows an exemplary component for application of the invention. An automobile door inner panel and outer panel are shown in a spaced apart position prior to being assembled and joined together.

Consider, for example the application of friction stir welding for permanently attaching a door outer panel to a door inner panel as shown in FIG. 1.

FIG. 1 shows a door assembly 10 comprising door outer panel 12 and door inner panel 18. Door outer panel 12 has a show surface 19 which is bent through approximately 90 degrees toward inner surface 13 around its periphery to form flange 11. Darts or cuts (not shown) may be made in flange 11 to relieve the compressive stresses which would otherwise result from forming a continuous flange with this geometry. Flange 11 extends completely around the periphery of outer panel 12 and forms a shallow receptacle dimensioned to receive inner panel 18.

Figure 2:
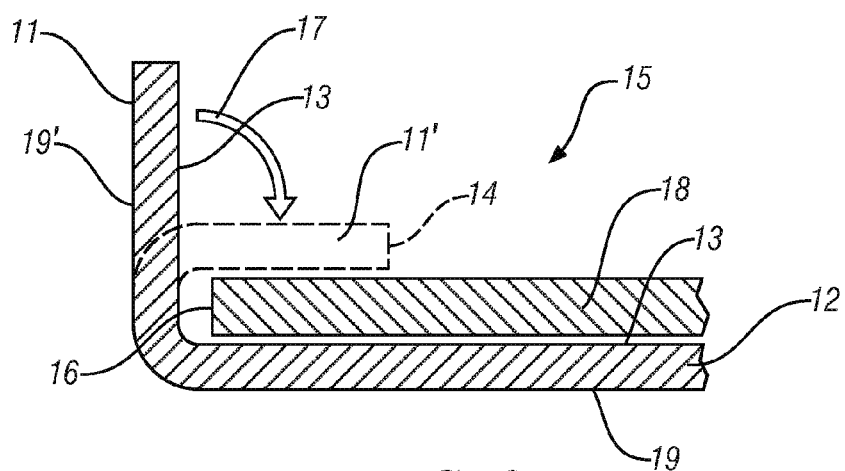
FIG. 2 illustrates, a sectional view of the formation of the hemmed joint used to secure together the inner and outer panels of the door shown in FIG. 1, viewed in a direction parallel to the panel perimeter, at section 2-2 in FIG. 1.

FIG. 2 shows, in section, an enlarged view of outer panel 12 with show surface 19 along section 2-2 after inner panel 18 has been positioned within flange 11. Once inner panel 18 is suitably positioned and located by flange 11, a surface of inner panel 18 abuts the inner surface 13 of door outer panel 12. To secure the inner and outer panels together, flange 11 is first bent and rotated inwardly by application of moments applied in the direction of arrow 17. This forms a hem flange with the periphery 16 of inner panel 18 positioned between outer body panel 12 and folded over flange portion 11' (shown in ghost) of outer body panel 12 to complete flanged joint 15. Friction stir welding may then be employed to permanently attach the inner and outer panels together.

The end 14 of flanged-over portion 11' (FIG. 2) is shown in ghost in FIG. 1 and generally parallels the periphery 16 of inner panel 18. This flanged-over joint 15 which relies on purely mechanical interaction between inner panel 18 and outer panel 12 will be permanently secured by forming a continuous friction stir weld around the perimeter of the assembly. The weld may be positioned between peripheral surface 16 of inner panel 18 and end 14 of flanged over portion 11' or along end 14.

Figure 3:
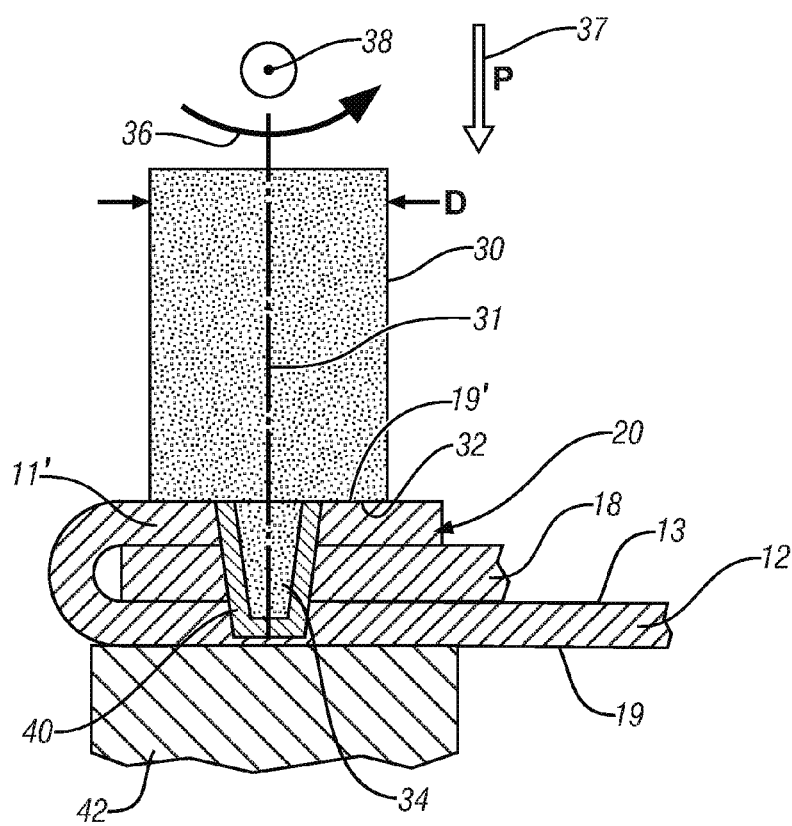
FIG. 3 shows, in sectional view, an intermediate stage of a linear friction stir welding process being conducted on the hemmed joint of FIG. 2 using a conventional solid anvil viewed in the same direction as FIG. 2.

FIG. 3 shows an enlarged, in-process, sectional view of a friction stir welding operation for permanently joining the inner and outer panels in the configuration of joint 15 in FIG. 2. A friction stir tool comprising a tool body 30, a pin 34 and tool shoulder 32 is moving along the weld seam in a direction 38, that is, out of the page, to form welded joint 20. The tool is rotating at a suitable speed, generally at about 500 to 2500 revolutions per minute (rpm), about its centerline 31 lying approximately in the plane of the paper, in a direction indicated by arrow 36. Tool shoulder surface 32 at least contacts and more preferably penetrates by about 0.1 millimeters (0.004 inch) the outer surface 19' of folded over flange portion 11' of outer body panel 12. Pin 34 completely penetrates folded-over flange portion 11' and inner panel 18 but only partially penetrates outer body panel 12. Rotating pin 34 is shown surrounded by a stirred region 40 which comprises stirred-together portions of outer body 12, folded over flange 11' and inner panel 18. It is the cooled and re-hardened stirred material 40 which imparts strength to joint 20. This configuration is maintained by application of suitable load P directed approximately normal to the workpiece surface as shown at arrow 37. Load P, is transmitted through the joint which is supported by anvil 42 in contact with show surface 19 of outer body panel 12.

Consideration of FIGS. 1 and 3 indicates that if a friction stir joint were made along the entire door perimeter 16 using a fixed anvil, a very large anvil underlying a complete panel assembly and with a shaped surface complementary to the hemmed panels would be required.

In this invention compact anvils with cooperating moveable face elements are provided. These elements enable relative motion between show surface 19 and anvil 42 in the direction indicated by arrow 38 while under load P applied in the direction indicated by arrow 37 (FIG. 3). It is preferred that such relative motion occur under low lateral forces and also that it not mar or damage show surface 19. However, the anvil is still required to provide full support to the workpieces under the applied welding pressure. It will be appreciated that achieving motion of contacting surfaces under some generally normal load by application of low lateral forces requires that a low coefficient of friction exist between the surfaces.

Figure 4:
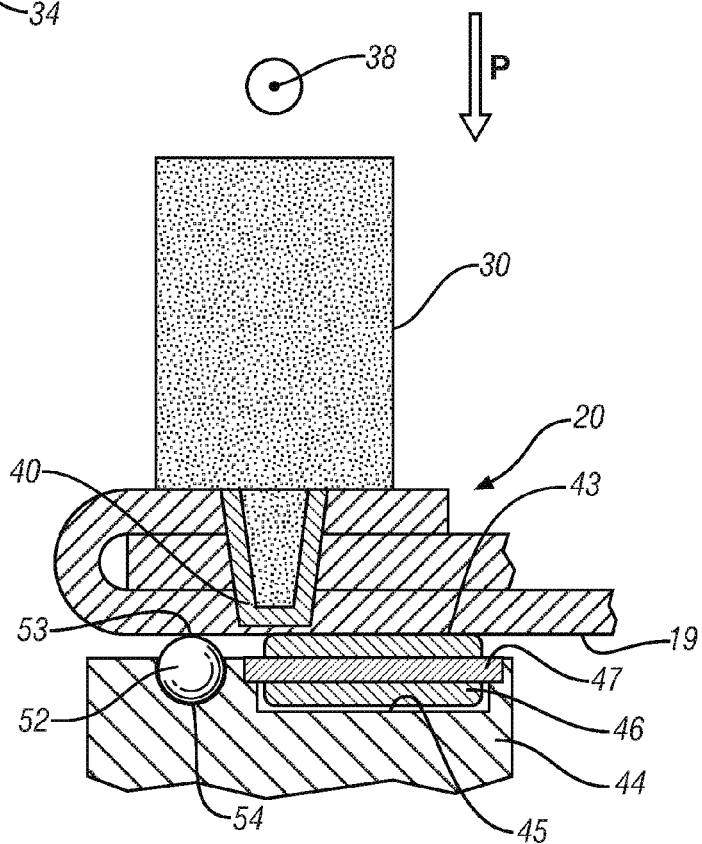
FIG. 4 shows the same linear friction stir welding process as shown in FIG. 3, viewed in the same direction, and illustrating an embodiment of a moveable anvil.

FIG. 4 shows the same friction stir welding configuration as FIG. 3 but employing an anvil body 44 with a plurality of cylindrical rolling elements 46 and/or a plurality of spherical rolling elements 52 suitably supported to enable relative motion of joint 20 and tool 30 in direction 38. Spheres 52 are positioned in close-fitting lubricated cavities 54 to enable low friction rotation. Cylinder 46 is spaced apart from mounting cavity 45 and is supported by bearings 48 on axle 47 to enable low friction rotation. Thus either or both of sphere 52 or cylinder 46 enable low friction, low lateral force motion of joint 20 in direction 38. If the joint geometry demands motion in the plane of the joint in a direction other than direction 38, this may be accommodated by introduction of optional thrust bearing 50 interposed between upper anvil portion 56 and lower anvil portion 58, as shown at FIG. 5.

The plurality of spherical rolling elements 52 and cylindrical rolling elements 46 act cooperatively to support workpieces of joint 20. But the elements, as shown, do not directly interact. Thus point of contact 53 of spherical rolling element 52 and line of contact 43 of cylindrical rolling element 46 are required to lie on a common surface. It is preferred that the common surface be an essentially planar surface. More generally, workpiece-supporting surfaces of all of the plurality of elements are required to lie on a common, generally planar, surface.

For clarity of illustration, the span of anvil body 44, as depicted in FIG. 4, and again in FIG. 5, is greater than preferred. Preferably the span of the anvil body should more closely approximate the shoulder diameter, D, of tool 30 indicated, for convenience, in FIG. 3. Particularly, it is preferred that the span, S (FIGS. 6 and 7), of the anvil range from 120% to 200% of the tool shoulder diameter.

Spherical rolling elements 52 suitably restrained in tight-fitting lubricated cavity 54 may also be mounted in anvil portion 56 (FIG. 5) to enable substantially frictionless motion of joint 20. The use of spherical load bearing elements which may accommodate joint motion in any direction in the plane of the joint would obviously render thrust bearing 50 unnecessary. The number of either cylindrical 46 or spherical 52 elements should be selected to provide sufficient numbers of point and/or line contacts to reduce local loading of the friction stir workpiece surface.

Because spheres and cylinders allow for only point or line contact with a flat surface, the bearing area is small and the local pressure correspondingly high. Thus an alternative approach to reducing local workpiece surface loads, more suited to the cylinder design, is to apply a thin coating of modestly compliant material to the surface of the rolling element. Under load the compliant material will deform, spread and increase the bearing area. An exemplary material may be an unfilled structural polymer, such as polyurethane, which is readily available in a variety of durometers.

In FIGS. 4 and 5, both cylindrical and spherical rolling elements have been depicted as mounted in a common anvil 44 or common anvil portion 56. Alternatively the anvil portion may comprise a plurality of cylindrical rolling elements only or a plurality of spherical rolling elements only. These configurations are depicted in plan view in FIGS. 6 and 7. FIGS. 6 and 7 also make clear that the plan view geometry of upper anvil portion 56 may exhibit any convenient configuration: in FIG. 6 a circular form 56 is shown; FIG. 7 shows a generally rectangular configuration identified as 56'.

Figure 8:
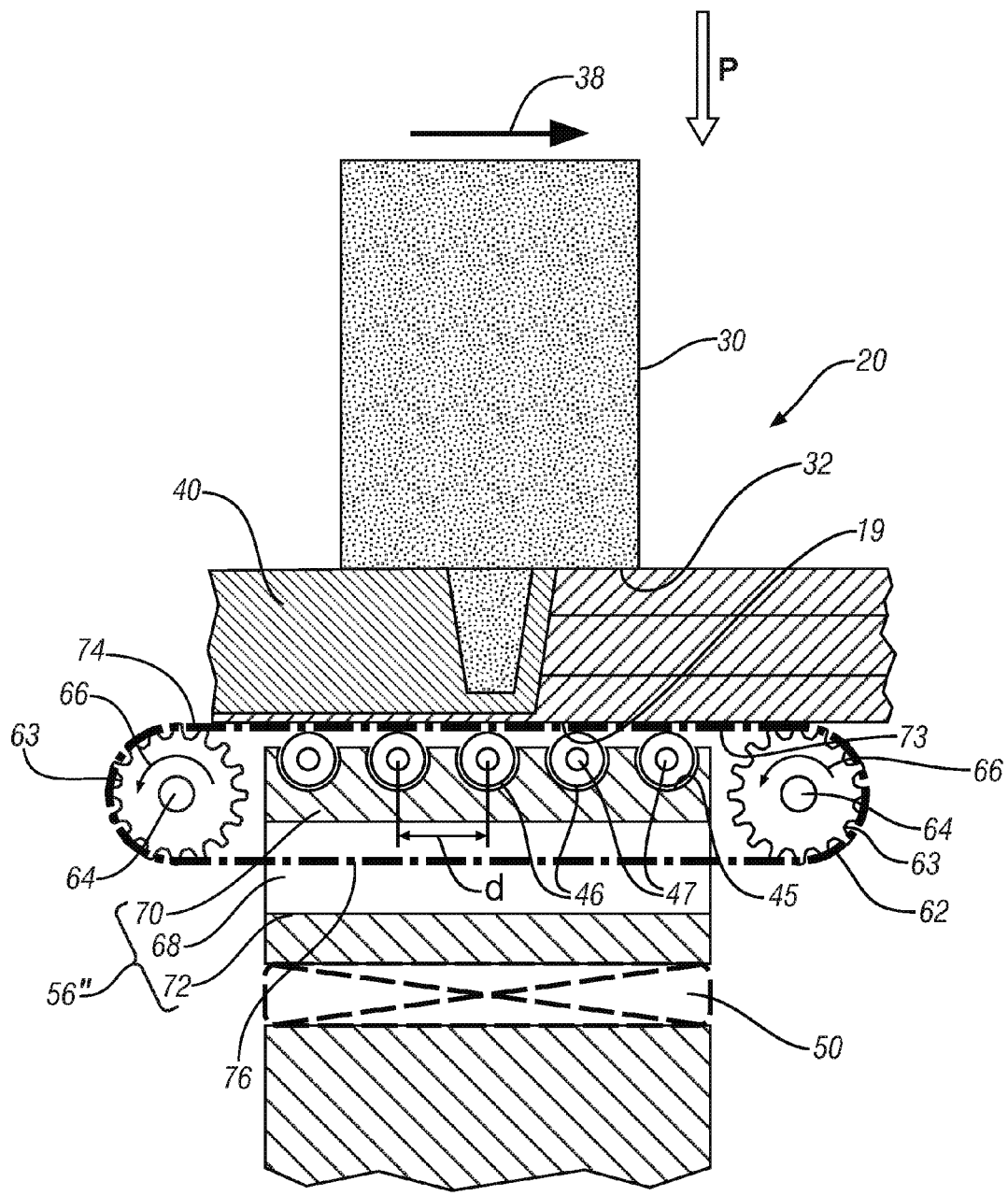
FIG. 8 shows, in sectional view, a portion of the same welding process as shown in FIG. 3 but viewed in a direction perpendicular to the panel perimeter and orthogonal to the viewing direction of FIG. 3, illustrating yet another embodiment of a moveable anvil.

Another embodiment is shown in FIG. 8 in side view, that is, in a direction orthogonal to the views shown in FIGS. 4 and 5. Here a plurality of rollers 46, supported on axles 47 and suitable bearings (not shown) are mounted in segment 70 of anvil portion 56". A portion of continuous flexible support belt 62 is supported at each end of the loop with drive rollers 63 and has an upper length 74 which is supported on rollers 46 and a lower length 76 which passes freely under segment 70 of anvil portion 56". Drive rollers 63, supported on axle 64 mounted in suitable support (not shown) with bearings (not shown) suitable for substantially frictionless operation, will rotate in a direction indicated by arrow 66 responsive to the motion of tool 30 in moving along joint 20 in the direction of arrow 38. Optionally, one or both of drive wheels 63 may be power driven (not shown). This power-driven approach which may reduce the load required to enforce tool motion in the direction of arrow 38 would require an independent power source. The power source could be an electric or hydraulic motor and could be coupled directly to support belt 62 or engage one or both of drive wheels 63. It may be beneficial to gear down the motor by means of a gearbox or similar mechanism to achieve significant torque from a compact motor. The motion of support belt 62 should match the motion of tool 30. Thus appropriate sensors (not shown) to measure the motion of tool 30 and suitable power source controllers (not shown) to synchronize the motion of support belt 62 and tool 30 will also be required.

The application of power to the drive rollers 63 in FIG. 8 can provide advantages in manufacturing operations. Even with the use of a compact, moveable, low-friction anvil of the type described, fairly high forces may be required to move the rotating tool through the workpieces that are being joined. If these forces were accommodated by a robot, either through movement of a weld gun mounted on a robot welding a fixed part or the movement of a panel held by a robot and moving relative to a fixed weld station, the use of powered rollers could significantly reduce forces on the robot. This could allow the use of lower force capacity robots or allow the robot to extend its reach, and allow welding in situations where unpowered anvils would result in forces beyond the robot's capability.

It will be appreciated that both in the unpowered or passive configuration embodiment of FIG. 8 and in any powered or active configuration drive rollers 63 positively engage belt 62 and ensure that belt 62 remains suitably aligned and oriented with respect to anvil 56". It will also be appreciated that a power source may be attached to at least one of the plurality of rollers indicated in FIG. 7 to similarly enable powered motion and achieve similar benefits. Again, any suitable power source may be employed in conjunction with appropriate sensors and a controller.

Anvil segment 70 is attached to and supported by spaced-apart sideplates 68 so positioned as to avoid interference with flexible support belt 62. Sideplates 68 are also attached to anvil segment 72, and segment 70, sideplate 68 and anvil segment 72 combine to comprise upper anvil portion 56". Upper anvil portion 56" may optionally be mounted on thrust bearing 50 if additional rotational capability in the plane of the joint is required.

Flexible support belt 62 has been described and depicted in a particular embodiment as supported on a plurality of rotating cylindrical elements. Such description is exemplary and not limiting. It is recognized that spherical elements like those shown at 52 in FIGS. 4 and 5 might also be used to support upper length 74 of belt 62. In another embodiment, with, upper length 74 might be directly supported on suitably-lubricated surface 41 of anvil 56". Alternatively, a pressurized fluid, for example air, might be introduced between surface 41 and the underside 73 of upper length 74 to support load P and enable substantially frictionless motion of belt 62.

In both powered and unpowered configuration it is preferred that friction between belt surface 74 and workpiece surface 19 be maximized to minimize opportunity for slippage of the workpiece on the belt, since this might mar workpiece surface 19.

Figure 9:
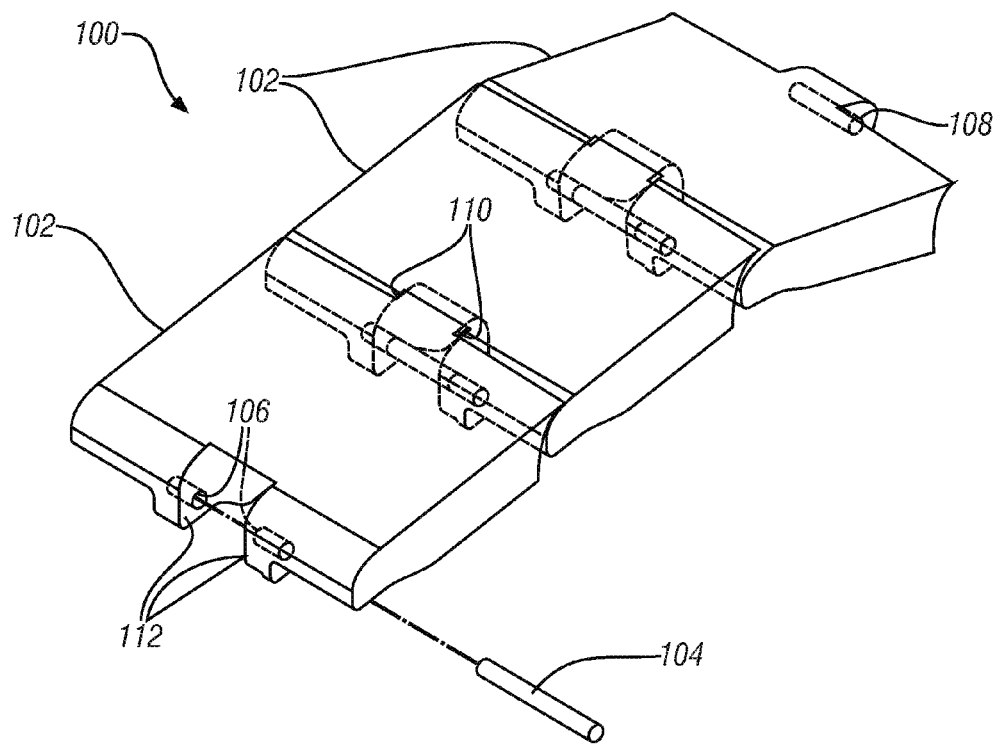
FIG. 9 shows an exemplary depiction of a portion of a continuous belt comprising a plurality of like elements with complementary features enabling them to be joined end-to-end while allowing them to rotate about their joint line.

Belt 62 may embody many designs. For example, it could include designs fabricated from abutting or partially-overlapping hinged planar elements such as are used for vehicle drive tracks or conveyor belts. A representative design is illustrated in FIG. 9 which shows a portion 100 of such a belt comprising three links 102 attached to one another by attachment pin 104 which passes through complementary holes 106 and 108 to pivotably attach adjacent links 102 when surfaces 110 and 112 are matingly engaged. As is well known to those skilled in the art, belt 62 may also include engagement features (not shown) to positively engage drive wheel 63, here depicted as sprocket-like to complementarily mesh with such engagement features. Such engagement features may also be absent from belt 62, and belt 62 may engage a smooth-surfaced drive wheel 63 through frictional interaction between them. The individual links of such a belt may be fabricated from a wide range of materials including metals and alloys, polymers, ceramics and composites, provided they are capable of withstanding the weld process pressure and temperature.

Woven wire belts, constructed from a plurality of wires interconnected to form a continuous belt might also be employed for belt 62.

Figure 10:
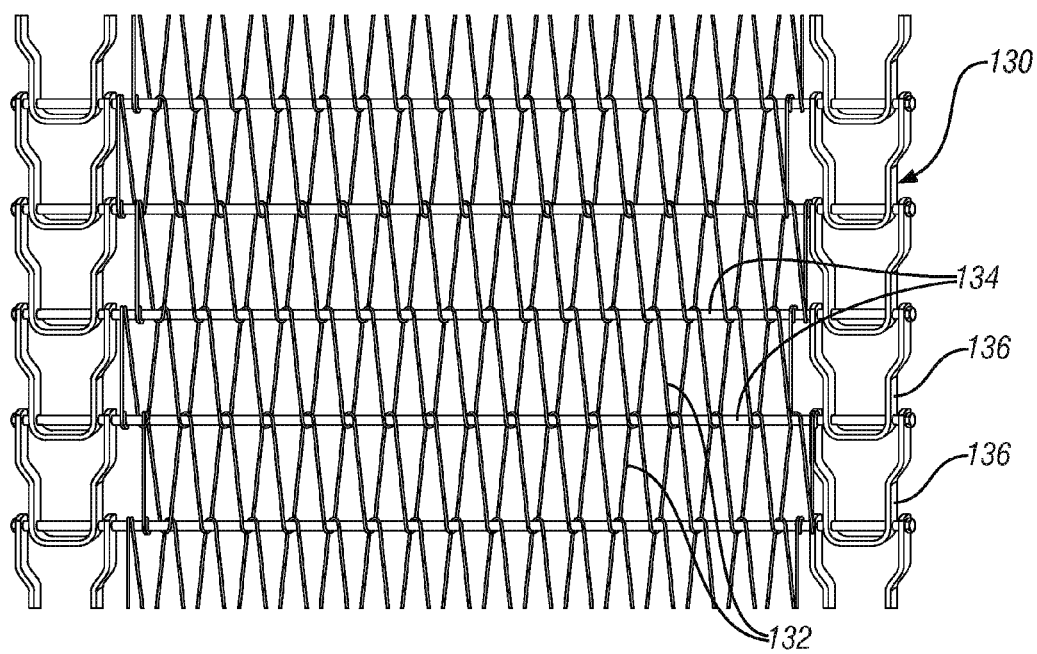
FIG. 10 shows an exemplary depiction of a portion of a woven wire continuous belt incorporating features for engaging a drive wheel.

For clarity, an open-weave design of such a wire belt is illustrated in FIG. 10 but other and more closely woven configurations are well known and may be adopted if better suited to accommodate the applied pressure. In FIG. 10 a woven mat 130 comprises lengths of wire in the form of spaced-apart continuous metal helical wire loops. The wire loops have a race-track form, that is linear sections connected by semicircular segments. The semicircular segments are positioned on hinge rods 134 and the linear sections span the distance between the hinge rods which are laterally displaced from one another by equal distances. At the extremities of hinge rods 134 are located half-loop segments 136. Half-loop segments 136 are open and although generally resembling the letter 'U' have a larger spacing between the arms of the 'U' at their open end and a lesser spacing between the arms of the 'U' at their closed end so that successive half-loop segments may nest together. Each half-loop has two sets of holes in its arm segments which secure the half-loop to two adjacent hinge rods. The half-loops serve to maintain the hinge rod spacing and may also serve to positively engage drive wheel 63.

Belt 62 may also be a continuous loop of compliant material which may be fiber reinforced either with individual fibers or by a woven fiber mat. Since, again, the material used should be able to tolerate the temperatures arising during welding, this approach may be more suited to lower melting point workpieces. A composite belt comprising a continuous loop of compliant material with a plurality of temperature resistant plates, or pads so arranged as to not impede or inhibit flexure of the underlying compliant material, may also be used.

Tool shoulder 32 of tool 30 should at least engage, and more preferably penetrate, outer surface 19' of folded over flange portion 11' (see FIG. 3) to about 0.1 millimeter. Tool shoulder 32 has a typical diameter of about 10 millimeters for thin sheet metals and to maintain contact with surface 19' over such an extent requires that the anvil support surface be generally planar over a comparable extent, when under operating load, P. Thus, returning to FIG. 7 which shows cylindrical supports 46 with centerlines located a distance 'd' apart with unsupported regions between, it is clear that the belt 62 and belt support means must cooperatively interact to generate the preferred substantially planar support for joint 20. Thus mechanically stiff belt materials and structures may be employed in conjunction with spaced-apart supports and less stiff belt materials and structures may be employed where continuous support is provided.

The above description of embodiments of the invention should be considered as exemplary in nature and, thus, variations thereof are not to be regarded as a departure from the spirit and scope of the invention. Particularly, the intent of this invention is not limited to joints involving only two workpieces or to only those joints illustrated.

The invention claimed is:

1. A friction stir welding apparatus comprising a rotatable friction stir welding tool and an anvil, the tool and anvil being adapted to receive between them a workpiece comprising a plurality of metal layers each of the metal layers of the workpiece having a thickness, the workpiece having an anvil-contacting surface;

the welding tool having a cylindrical body rotatable about an axis and terminating with a shoulder and an axially extending pin, the shoulder having a diameter;

the anvil having a span, there being a ratio of the span of the anvil to the shoulder diameter of the tool, the anvil being position-able on the rotational axis and opposing the pin to support a workpiece against a welding load applied to a workpiece during welding, the anvil further comprising;

an anvil body with an anvil body surface spaced from the pin to receive a workpiece, and incorporating a plurality of anvil rolling elements, the anvil rolling elements being partially immersed in the anvil body surface, the anvil rolling elements having linear or point contacts lying on a common, essentially planar surface, substantially normal to the welding tool rotation axis, for carrying and rolling contact with the anvil-contacting surface of the workpiece, the linear or point contacts having elevations from the surface of the anvil body for substantially planar contact with the workpiece, the anvil rolling elements occupying a span of the anvil body surface generally centered on the tool rotational axis and at least coextensive with the diameter of the tool shoulder with at least one of the rolling elements being located within the diameter of the tool shoulder and substantially on the tool rotation axis;

wherein, in the performance of the friction stir welding process a continuing pressure is applied to the workpiece metal layers by the tool generally along the axis of the tool to compel the anvil-contacting surface of the workpiece metal layers into intimate contact with the anvil rolling elements in the anvil body;

the anvil rolling elements of the anvil surface enabling transverse relative motion of the workpiece with respect to the welding tool rotation axis as the welding tool is applying pressure on the workpiece.

2. The friction stir welding apparatus of claim 1 wherein the anvil rolling elements comprise freely-rotating spherical bodies, each supported in an individual close-fitting lubricated cavity.

3. The friction stir welding apparatus of claim 1 wherein the anvil rolling elements comprise freely-rotating cylindrical bodies, each of the cylindrical bodies being attached to a shaft, the shafts being supported on bearings mounted in the anvil body.

4. The friction stir welding apparatus of claim 3 wherein at least one of the cylindrical bodies is covered with a uniform coating of compliant material.

5. The friction stir welding apparatus of claim 4 wherein the compliant material is a polyurethane.

6. The friction stir welding apparatus of claim 1 wherein the anvil body comprises a first portion and a second portion, the first portion comprising the substantially planar workpiece-supporting surface for supporting the workpiece, the first portion being connected to the second portion by a thrust bearing oriented and positioned to facilitate rotation about an axis substantially normal to the work-piece supporting surface.

7. The friction stir welding apparatus of claim 1 wherein the thickness of each of the metal layers is between 1 millimeter and 4 millimeters.

8. The friction stir welding apparatus of claim 1 wherein the ratio of the span of the anvil to the shoulder diameter of the tool ranges from 1.2 to 2.0.

* * * * *